US006877578B2

(12) United States Patent
Krzesicki et al.

(10) Patent No.: US 6,877,578 B2

(45) Date of Patent: Apr. 12, 2005

(54) MULTI-AXLE VEHICLE DRIVE SYSTEM

(75) Inventors: Richard M. Krzesicki, Ann Arbor, MI (US); Zhesheng Li, Dearborn Heights, MI (US); Gregory J. Stout, Ann Arbor, MI (US); Zilai Zhao, Canton, MI (US); Kevin J. Pavlov, Livonia, MI (US)

(73) Assignee: Visteon Global Technologies, Inc., Van BurenTownship, MI (US)

( * ) Notice: Subject to any disclaimer, the term of this patent is extended or adjusted under 35 U.S.C. 154(b) by 125 days.

(21) Appl. No.: 10/241,907

(22) Filed: Sep. 12, 2002

(65) Prior Publication Data

US 2004/0050599 A1 Mar. 18, 2004

(51) Int. Cl.[7] .............................................. B60K 17/356

(52) U.S. Cl. ...................... 180/243; 180/65.2; 180/65.4

(58) Field of Search ................................ 180/242, 243, 180/244, 65.2, 65.3, 65.4; 477/3, 5

(56) References Cited

U.S. PATENT DOCUMENTS 3,659,672 A 5/1972 Jacobus
3,970,160 A 7/1976 Nowick
4,042,056 A * 8/1977 Horwinski ................. 180/65.2
4,211,930 A 7/1980 Fengler
4,335,429 A 6/1982 Kawakatsu
4,444,285 A 4/1984 Stewart et al.
5,415,245 A 5/1995 Hammond
5,586,613 A * 12/1996 Ehsani ...................... 180/65.2
5,644,200 A 7/1997 Yang
6,205,379 B1 3/2001 Morisawa et al.
6,321,865 B1 * 11/2001 Kuribayashi et al. ....... 180/243
6,349,782 B1 2/2002 Sekiya et al.
6,394,209 B1 5/2002 Goehring et al.
6,419,040 B1 7/2002 Kitano et al.
6,434,469 B1 8/2002 Shimizu et al.
6,524,217 B1 * 2/2003 Murakami et al. ............. 477/5
6,543,561 B1 * 4/2003 Pels et al. .................. 180/65.2
6,569,055 B1 * 5/2003 Urasawa et al. ............... 477/5
6,638,195 B1 * 10/2003 Williams ....................... 477/5
2001/0011050 A1 * 8/2001 Yamaguchi et al. ........... 477/3
2001/0017225 A1 * 8/2001 Yamamoto et al. ........ 180/65.2
2002/0023790 A1 * 2/2002 Hata et al. ................. 180/65.3
2002/0139592 A1 * 10/2002 Fukasaku et al. .......... 180/65.2
2003/0098185 A1 * 5/2003 Komeda et al. ........... 180/65.2

FOREIGN PATENT DOCUMENTS

EP 1 127 735 A3 4/2002
EP 1 291 219 A2 3/2003
EP 1 306 257 A2 5/2003
JP 2000-264086 9/2000

* cited by examiner

*Primary Examiner*—Anne Marie Boehler

(74) *Attorney, Agent, or Firm*—Dickinson Wright PLLC

(57) ABSTRACT

A drive assembly including an electric motor and frequency variable generator for use with a multi-axle vehicle. The vehicle generally includes an engine driving a first axle and a drive assembly with an electric motor driving a second drive axle. The drive assembly includes a frequency variable generator with an input shaft driven by the engine and the electric motor electrically communicates with the generator to receive output power from the generator. Other details of selected embodiments of the invention include the frequency variable generator having a rotor coupled to rotate with the engine output shaft and a stator electrically connected to the electric motor. An inverter is electrically connected to an electrical power source, such as a battery or the frequency variable generator, as well as to the rotor. A controller communicates with the inverter and is configured to control the magnitude and frequency of the power communicated from the inverter to the rotor winding.

19 Claims, 2 Drawing Sheets

MULTI-AXLE VEHICLE DRIVE SYSTEM

BACKGROUND OF THE INVENTION

The present invention generally relates to a drive system for a vehicle and, more particularly, to a multi-axle vehicle where one of the drive axles is driven by an electric motor.

Conventional four-wheel drive vehicles commonly include a transfer case for selectively distributing engine power to one or both of the front and rear drive axles. Efforts to increase the efficiency, reliability, and cost effectiveness of such systems have resulted in the development of a variety of transfer cases, differentials, and torque biasing mechanisms including hybrid four-wheel-drive systems wherein the primary drive axle is mechanically driven by the engine output and the secondary or auxiliary axle is driven by an electric motor. These systems have numerous advantages including reducing the weight and packaging size of the drive system such as by eliminating the mechanical shaft between the engine and auxiliary drive wheels. The elimination of the drive shaft to the auxiliary axle also increases system modularity, simplifies assembly tasks, and commonizes the underbody configuration across vehicle platforms, all of which contribute to the overall reduction of the complexity and cost of assembly operations.

In these hybrid systems, the electric motor is typically powered by the vehicle battery. A high-power switching device, such as an inverter, receives electrical power from the battery and then transmits power to the motor. While these systems have certain desirable features, they also suffer from a variety of drawbacks including the need for a high power inverter, electronics to condition the power supplied to the inverter as well as high voltage and power requirements that reduce the system effectiveness and add undesirable weight. Further, as conventional systems rely upon a battery or engine mounted alternator/generator for the power supply, the generated power is not synchronized to the speed of the driven wheel making it difficult and costly to compensate for speed or phase differences.

SUMMARY OF THE INVENTION

In view of the above, the present invention is directed to a drive assembly including an electric motor and frequency variable generator for use with a multi-axle vehicle. The vehicle generally includes an engine driving a first axle and a drive assembly with an electric motor driving a second drive axle. The drive assembly includes a frequency variable generator with an input shaft driven by the engine and the electric motor electrically communicates with the generator to receive output power from the generator. Other details of selected embodiments of the invention include the frequency variable generator having a rotor coupled to rotate with the engine output shaft and a stator electrically connected to the electric motor. An inverter is electrically connected to an electrical power source, such as a battery or the frequency variable generator, as well as to the rotor. A controller communicates with the inverter and is configured to control the magnitude and frequency of the power communicated from the inverter to the rotor winding.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
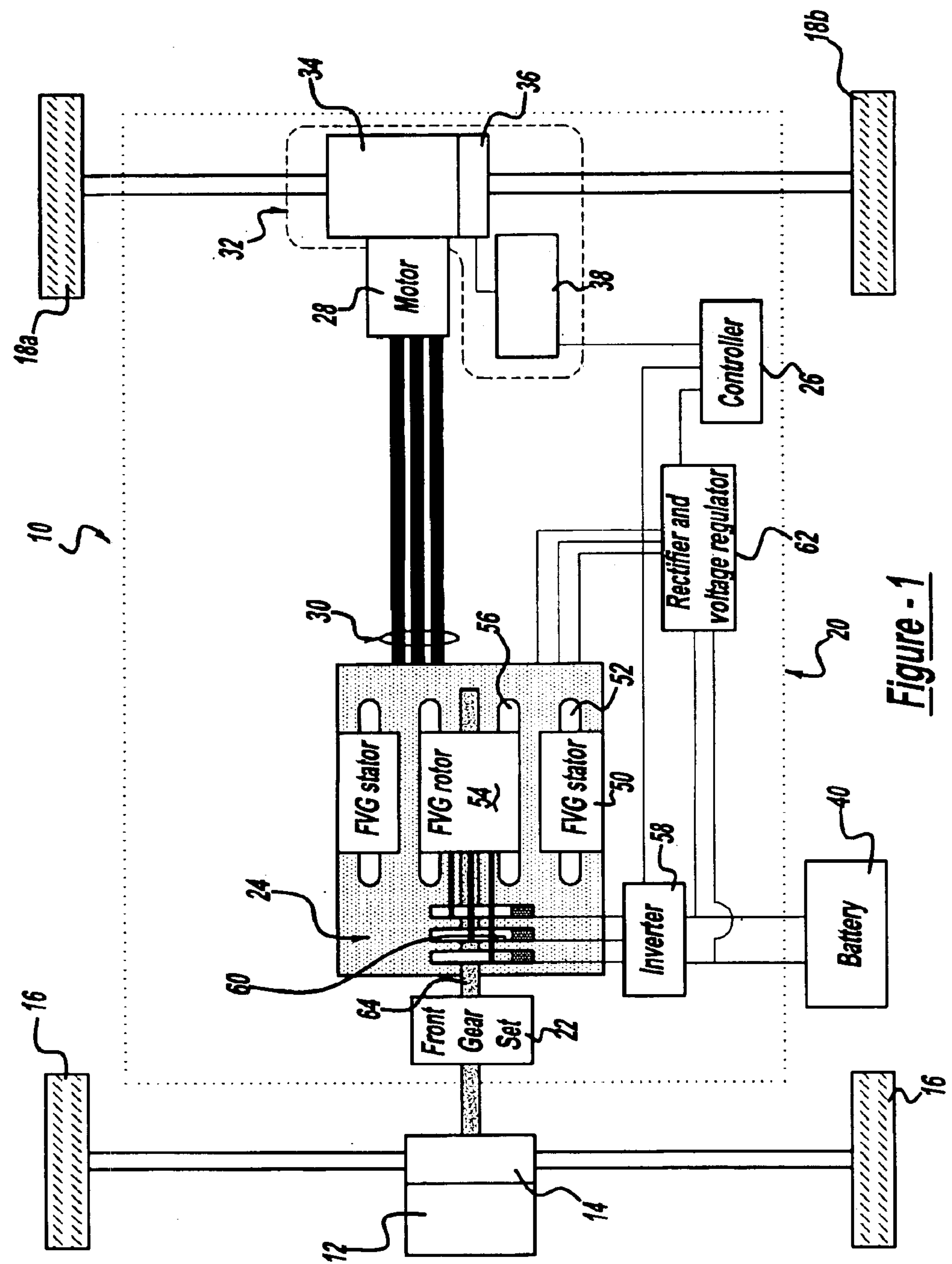
FIG. 1 is a schematic illustration of a four-wheel-drive-vehicle having a secondary drive assembly according to the present invention.

FIG. 1 illustrates a representative four-wheel-drive vehicle 10 that includes an engine 12 and transmission 14 mechanically coupled to primary drive wheels 16 in a conventional manner. Secondary or auxiliary drive wheels 18*a* and 18*b* are powered by a secondary drive assembly 20 that receives mechanical drive power from a front gear set 22 and includes a frequency-variable-generator 24, controller 26, and electric motor 28. Motor 28 receives power from the FVG 24 via cables 30 and provides mechanical drive power to a torque distribution mechanism 32 that selectively distributes torque to the auxiliary drive wheels 18*a* and 18*b*. In the illustrated embodiment, the torque distribution mechanism 32 includes a gear set and differential 34, a torque biasing actuator 36, and a local device controller 38 operatively coupled to the rear gear set and differential 34 and/or torque biasing actuator 36 to control the biasing of drive torque between the right and left auxiliary drive wheels 18*a* and 18*b*.

Notwithstanding the representative illustration and description of the invention herein, those skilled in the art will appreciate that the secondary drive assembly 20 may be used within a system 10 having a variety of alternative configurations. For example, the front and rear gear sets, as well as the differential, may be of any conventional configuration such as planetary or parallel shaft gear arrangements. The vehicle 10 may also include additional or alternative drive train components. Further, while the vehicle 10 is described and illustrated in this application as a four-wheel-drive vehicle with the rear axle being driven by the electric motor 28, those skilled in the art will appreciate that the invention is equally applicable in other multi-wheel applications and that the drive assembly 20 may be used as a primary drive in such systems.

Turning now to the structure and operation of the secondary drive assembly 20, the frequency-variable-generator (FVG) 24 illustrated in FIG. 1 is a double-fed generator capable of delivering a wide range of variable frequency and magnitude power to the electric motor 28. The illustrated FVG 24 includes a stator 50 with one or more conductive windings 52, a rotor 54 rotatable within the stator 50 and having one or more conductive rotor windings 56, and slip rings and brushes 60. In the illustrated embodiment, the stator winding is a three-phase winding and the rotor includes a conventional lamination stack with m-phase windings. The rotor 54 is coupled to the rotational output from the engine, represented by front gear set output shaft 64, to provide a mechanical input to the FVG 24. An inverter 58 communicates with the vehicle battery 40 and the rectifier/voltage regulator 62 to feed AC power to the rotor. The rectifier/voltage regulator 62 is also electrically connected to the stator 50 to receive electrical output from the FVG. The controller 26 communicates with the inverter 58 to control the frequency and magnitude of the AC power communicated to the slip rings and brushes 60 and with the rectifier/voltage regulator 62 to selectively communicate power from the rectifier/voltage regulator 62 to the inverter 58 or battery 40. The rectifier/voltage regulator 62 ensures that the power communicated to the battery 40 or inverter 58 is at the proper voltage, commonly though not necessarily 12 volts.

As in conventional alternators/generators, rotation of the current fed rotor 54 creates a magnetic field to energize the stator winding 52. However, in conventional generators, a direct current (zero frequency) is fed to the rotor to create output electrical power of a constant frequency for a given rotor rotational speed. The stator and rotor configuration of the present invention also creates a magnetic field within the FVG that will generate a constant frequency power output if the rotational velocity of the output shaft 64 and rotor 54 are constant and the power communicated to the FVG rotor 54 via the inverter is at zero frequency. However, the present invention also permits generation of a variable frequency output to the electric motor even when the rotor speed is constant.

The inverter 58 receives DC power, preferably a low 12 volt current relative to conventional inverter power feeds, from the battery 40 or rectifier/voltage regulator 62 and communicates variable frequency three phase AC power to the rotor windings 56 via the slip rings and brushes 60. This variable frequency rotor power creates a variable frequency magnetic field within the stator 50 and a variable frequency AC power output from the FVG to the motor 28. As a result, the speed of the motor output can be varied even though the speed of the rotational input from the engine remains constant.

The rotational input 64 coupled to rotate the rotor 54 is described above as being an engine output, which may include inputs rotating at engine or various drive train component speeds. In the preferred embodiment, the rotor 54 is rotationally coupled to an engine driven shaft, such as the output 64 of the transmission 22, that rotates at a fixed ratio relative to the shaft driving the primary drive wheels 16. As a result, the frequency variation provided by the inverter need only account for a small portion of the FVG output frequency.

As noted above, the controller 26 selectively varies the frequency of the power communicated by the inverter 58 to the rotor 54. Generally, the magnitude and frequency of the FVG output is dependent upon the magnitude and frequency of the power communicated to the rotor and the rotational speed of the rotor 54 driven by the output shaft 64. Those skilled in the art will appreciate that the magnitude and frequency of the FVG output power and the power communicated to the rotor may vary for particular applications. For example, the frequency of the power communicated from the generator 24 to the motor 28 may range from 0 Hz to at least 300 Hz, with no theoretical upper limit. It is further anticipated that the inverter output frequency communicated to the FVG rotor 54 will be on the order of less than about ±20 Hz with a peak power of approximately 1 to 2 kW.

As noted above, power from the FVG may be communicated from the stator 50 to the motor 28 via cables 30. The FVG rectifier/voltage regulator 62 also communicates with the stator 50, such as via secondary stator windings (not shown), to selectively bleed off FVG output power to recharge the battery 40 or communicate power to the inverter 58 after the FVG rotor shaft reaches a predetermined speed. For example, for slow vehicle speeds, such as under about 10 mph, the rotational input to the FVG may not generate sufficient power to permit the rectifier/regulator 62 to divert generated power to the battery 40 or inverter 58. In such a case, the controller 26 causes the inverter to draw DC power from the battery 40. However, for higher vehicle speeds (e.g., over about 10 mph) the FVG generates sufficient AC power to drive the motor 28 and feed power back to the inverter 58 via the rectifier/voltage regulator 62. Thus, battery power is only required for slow vehicle speeds.

The dual power feeds to the inverter 58 has the further benefit of permitting the controller to cause the FVG to generate power for the motor 28 even when the FVG receives no mechanical input from the output shaft 64. Specifically, the controller may signal the inverter 58 to draw power from the battery and communicate this power to the rotor thereby inducing a current in the stator.

The present invention permits further modifications that will be apparent to those skilled in the art from this description. For example, the phase sequence of the FVG 24 relative to, the motor 28 may be changed to provide brake power to the auxiliary wheels 18*a* and 18*b*. This additional feature may be achieved through the use of conventional components such as a phase switch disposed between the FVG output and motor 28.

The operational features of the secondary drive assembly 20 having a FVG 24 will now be described in detail. As noted, the FVG is mechanically connected to the output shaft 64 of the transmission through a front gear set, and hence shaft RPM (nFVG) of the FVG rotor 54 is proportional to the average front-wheel RPM (nfrontwheel) by the ratio of Rf. That is, $$nFVG=Rf*n\text{frontwheel}$$

In the illustrated embodiment, the electric motor 28 is mechanically connected to rear wheels through rear gear set and differential 34. Hence, the rotational speed of the motor output shaft (nMOTOR) is proportional to the average rear-wheel RPM (nrearwheel) by the ratio of Rr. That is, $$n\text{MOTOR}=Rr*n\text{rearwheel}$$

The FVG stator winding 52 is a m-phase pFVG-pole-pair armature, which generates AC power and directly drives the motor 28, and the FVG rotor winding 56 is m-phase PFVG-pole-pair excitation winding, which is driven by the low power inverter 58. Fed by m-phase AC current with frequency of $f_{fFVGex}$, the rotor winding 56 excites a spatial sinusoidally distributed magnetic field that rotates about the FVG rotor at a frequency of $$f_{fFVGex/pFVG}$$

In the mean time, if the rotor, coupled to the transmission output shaft through the front gear set, is rotating at a speed of nFVG RPM, then the rotational speed of the excited magnetic field with respect to the stator 50 is $$n_{fFVG}=n_{FVG}+f_{fFVGex}/p_{FVG}*60$$

and hence the FVG output electrical frequency is $$f_{eFVG}=n_{fFVG}/60*p_{FVG}=n_{FVG}/60*p_{FVG}+f_{fFVGex} \quad (1)$$

Equation (1) shows that at a certain FVG shaft speed $n_{FVG}$, $f_{eFVG}$ can be controlled within a certain range by varying $f_{fFVGex}$.

Figure 2:
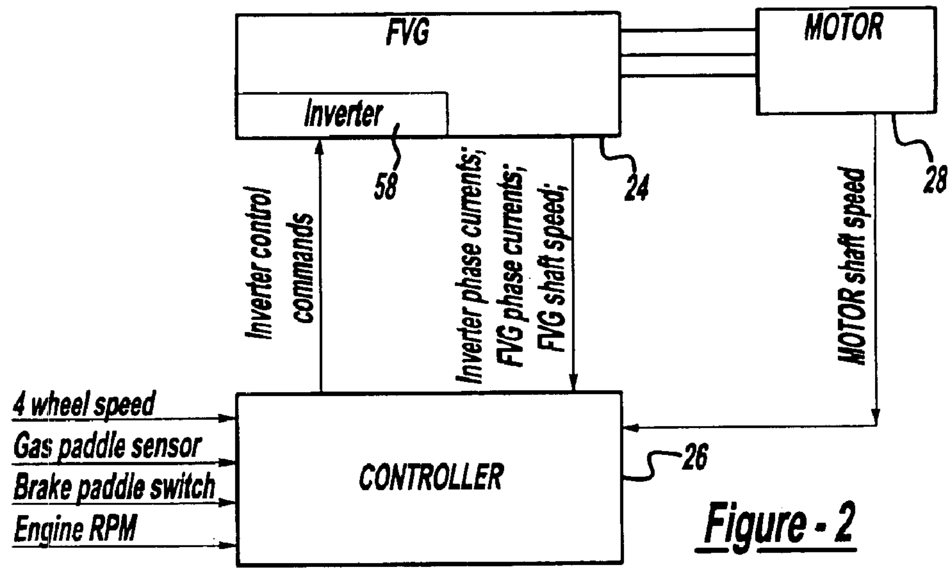
FIG. 2 a schematic representation of the controller interacting with the frequency variable generator and motor.

A schematic representation of the interaction between the controller 26 and the FVG 24, motor 28, inverter 58, and rectifier/voltage regulator 62 is illustrated in FIG. 2. The controller calculates the amount of power that can be transferred by the FVG 24 (based on, for example, the engine speed, FVG rotor speed, throttle position, vehicle battery status, and inverter power limit) and the amount of power needed by each of the auxiliary drive wheels under a particular vehicle state. The controller 26 determines the vehicle state in a conventional manner, such as by using vehicle performance sensors that monitor predetermined conditions—for example, wheel slip, wheel speed, accelerator pedal position, brake pedal switch, engine rpm, yaw rate, lateral acceleration, longitudinal acceleration, steering wheel angle, and/or ABS activation state. The controller may use secondary drive assembly performance data (such as, for example, inverter phase currents, FVG phase currents, FVG shaft speed, and motor shaft speed) to determine the amount of power to transfer from the FVG 24 to the motor 28. The controller 26 then generates inverter control commands that cause the inverter to feed power with the desired magnitude and frequency to the FVG rotor winding so that the proper power is transferred from the FVG to the motor. Those skilled in the art will appreciate that the above discussion and illustration of the controller 26, its method of operation, the vehicle state, and secondary drive assembly performance input data are provided for illustrative purposes only and that a variety of alternative configurations and operations may be used without departing from the scope of the invention as defined by the appended claims.

Figure 3:
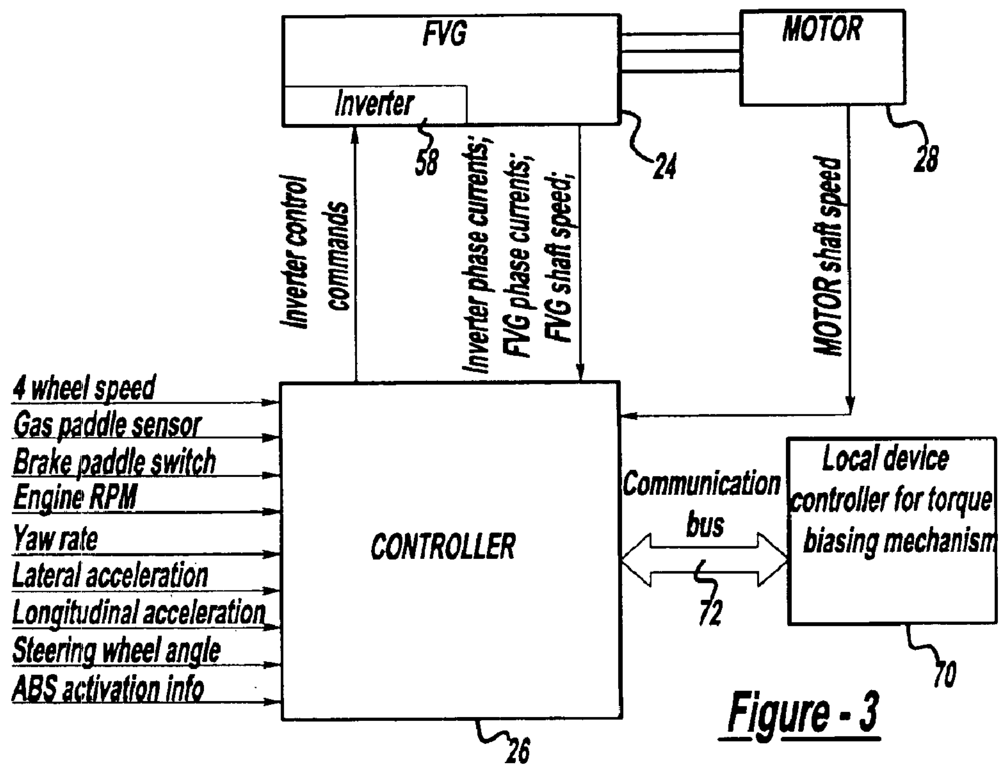
FIG. 3 is a schematic representation of the controller interaction with the frequency variable generator, motor, and a local device controller.

The overall efficiency and performance of the secondary drive assembly 20 and vehicle 10 may be further enhanced by using a torque biasing mechanism 32 that is controlled by the controller 26 or a local electronic controller 70 (FIG. 3) that communicates with the controller 26 such as through the illustrated communication bus 72. Many conventional four-wheel-drive systems include an externally actuated biasing mechanism having a programmable controller to provide active rather than passive biasing of torque. However, the torque is delivered to the biased axis from the engine drive train. As a result, the initial delivered torque and the actuation of the biasing mechanism are not under common control.

Conversely, in the present invention, drive torque is delivered to the rear gear set and differential 34 by the motor 28 which is controlled by the controller 26. Similarly, the controller 26 controls, either directly or indirectly through local controller 70, the force exerted by the torque biasing actuator 36. The ability to control both the magnitude of the torque input and the biasing actuator in a synchronized manner significantly increases the efficiency and performance of the system. For example, in the event a slip condition occurs at one of the auxiliary drive wheels 18*a* and 18*b*, the controller 26 can selectively and effectively alter the power generated by the FVG 24 and supplied to the motor 28 and/or the force exerted by the torque biasing mechanism 36. For example, if the left auxiliary wheel 18*a* loses traction, the reaction of a conventional system may be to actuate the torque biasing mechanism to reduce the torque delivered to the slipping wheel. However, conventional systems do not provide cooperative or synchronous control over the torque delivered to the rear gear set and differential 34. Conversely, with the secondary drive assembly of the present invention, the controller 26 controls both the torque transmitted to the differential 34 and the left and right distribution of the delivered torque via control over the torque biasing actuator 36. The secondary drive assembly 20, under the control of controller 26, has a further benefit of being able to selectively provide drive power to the auxiliary wheels 18*a* and/or 18*b* independent of wheel slip thereby providing a more responsive part-time all-wheel-drive system.

For completeness, it is noted that the torque biasing mechanism 32 described above may include a variety of conventional devices operative to receive a rotational input and distribute torque between driven wheels 18*a* and 18*b*. By way of example, the torque biasing mechanism 32 may include mechanically self actuated devices such as (a) a planetary differential incorporating a parallel shaft planetary arrangement using helical gearing to generate a thrust load to push planetary pinion gears against the differential case through friction material or (b) a bevel differential with stacked wet clutch packs self actuated by the differential side gear-separating load. The torque biasing mechanism 32 may also include actively controllable devices such as wet clutch pack designs that may be actuated when needed rather than requiring preloading of the clutch pack. Such devices generally provide extended clutch pack life and include a controllable electric motor to actuate the biasing mechanism as well as a gear train, ball screws, or other couplers for mechanical advantage. Other actively controllable devices include a mechanical actuator, such as a ball ramp, controllable by energizable electromagnetic coils positioned adjacent the ball ramp so that when the coil is activated one side of the ball ramp slows to create a mechanical advantage that is applied as a clamp load to the wet clutch plates. Hydraulic systems (such as those having a pump, control valve, and piston) to actuate a wet clutch pack may also be used to provide a controllable torque biasing mechanism. Conventional hydraulic systems include clutch pack and non-clutch pack systems. In the latter instance, hydraulic pumps are coupled to each wheel, hydraulically linked together, and controllable to direct the commanded torque to each wheel.

Finally, it is noted that the secondary drive assembly is illustrated and described herein as including a frequency variable generator 24 and a fixed frequency motor 28. Notwithstanding this described embodiment, those skilled in the art will appreciate that the present invention may alternatively include a fixed frequency generator operably coupled to the transmission and electrically communicating with a variable frequency motor. In this instance, the inverter would be configured to communicate with the motor to vary the field within the motor to achieve variable output with constant rotational speed of the transmission.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A multi-axle vehicle comprising:

an engine;

a first drive axle driven by said engine;

a drive assembly including a variable frequency generator, an input shaft driven by said engine, and an electric motor electrically communicating with said variable frequency generator to receive output power from said variable frequency generator, said variable frequency generator selectively generating an output power of variable frequency when said input shaft is rotating at a constant speed, said input shaft rotating at a fixed ratio relative to said first drive axle and wherein said variable frequency generator includes a stator with a winding and a rotor rotatable with said input shaft and relative to said stator, said rotor having a winding and wherein said drive assembly further includes an inverter coupled to a power supply and electrically connected to said rotor, said inverter communicating electrical power of variable frequency to said rotor; and a second drive axle driven by said electric motor.

2. The multi-axle vehicle of claim 1 wherein said inverter is electrically connected to a battery and to said stator to selectively draw power from said battery or said stator.

3. The multi-axle vehicle of claim 2 further including a controller communicating with said inverter, said controller being configured to control the frequency of the output power from the frequency variable generator by regulating the power frequency communicated from said inverter to said rotor windings.

4. The multi-axle vehicle of claim 3 wherein said generator input shaft rotates at a fixed ratio relative to said first drive axle.

5. The multi-axle vehicle of claim 3 further including a plurality of vehicle performance sensors, said controller communicating with said vehicle performance sensors and configured to control the frequency of the frequency variable generator output power based upon the vehicle state and drive assembly performance data.

6. The multi-axle vehicle of claim 5 wherein said drive assembly performance data includes inverter phase currents, the rotational speed of the electric motor output member and phase current and rotor speed of the frequency variable generator.

7. The multi-axle vehicle of claim 1 further including a controller communicating with said inverter and a torque biasing mechanism disposed between said electric motor and said second drive axle, said torque biasing mechanism including an actuator controlled by said controller.

8. The multi-axle vehicle of claim 7 wherein said second drive axle includes first and second output shafts and said torque biasing mechanism further includes a differential disposed between said first and second output shafts.

9. The multi-axle vehicle of claim 7 further including a local device controller communicating with said controller and said actuator.

10. The multi-axle vehicle of claim 1 further including a controller communicating with said inverter and a torque biasing mechanism disposed between said electric motor and said second drive axle, said torque biasing mechanism including an actuator controlled by said controller.

11. The multi-axle vehicle of claim 10 wherein said second drive axle includes first and second output shafts and said torque biasing mechanism further includes a differential disposed between said first and second output shafts.

12. The multi-axle vehicle of claim 10 further including a local device controller communicating with said controller and said actuator.

13. An engine powered vehicle having an engine with a rotary output shaft, a first drive axle mechanically driven by said engine, a second drive axle, and a drive assembly driving said second drive axle, said drive assembly comprising:

an electric motor;

a frequency variable generator having a rotor with a rotor winding and a stator, said rotor coupled to rotate with the engine output shaft, said stator electrically connected to said electric motor;

an inverter electrically connected to an electrical power source and said rotor winding; and a controller communicating with said inverter, said controller configured to control the magnitude and frequency of the power communicated from said inverter to said rotor winding.

14. The drive assembly of claim 13 wherein said electrical power source includes a battery and wherein said inverter is further electrically connected to said stator to selectively draw power from said battery or said stator.

15. The drive assembly of claim 13 wherein said frequency variable generator has an output power of variable frequency when the rotor is rotating at a constant speed.

16. The drive assembly of claim 13 wherein said engine output shaft rotates at a fixed ratio relative to the first drive axle.

17. The drive assembly of claim 13 further including a torque biasing mechanism disposed between said electric motor and said second drive axle, said torque biasing mechanism including an actuator controlled by said controller.

18. The drive assembly of claim 16 wherein said second drive axle includes first and second output shafts and said torque biasing mechanism further includes a differential disposed between said first and second output shafts.

19. The drive assembly of claim 16 further including a local device controller communicating with said controller and said actuator.

* * * * *

UNITED STATES PATENT AND TRADEMARK OFFICE

CERTIFICATE OF CORRECTION

PATENT NO. : 6,877,578 B2
DATED : April 12, 2005
INVENTOR(S) : Richard M. Krzesicki et al.

It is certified that error appears in the above-identified patent and that said Letters Patent is hereby corrected as shown below:

Column 2,
Line 37, before "herein" please insert -- provided --.

Column 4,
Line 22, after "to" (first occurrence) please delete ",".
Line 47, "PFVG-pole-pair" should be -- pFVG-pole-pair --.

Signed and Sealed this

Seventh Day of June, 2005

JON W. DUDAS
*Director of the United States Patent and Trademark Office*